US007437318B2

(12) United States Patent
Yuen et al.

(10) Patent No.: US 7,437,318 B2
(45) Date of Patent: Oct. 14, 2008

(54) SYSTEMS AND METHODS FOR ELECTRONIC OFF-LINE CATALOG

(75) Inventors: Henry Yuen, Pasadena, CA (US); Garth Conboy, LaJolla, CA (US); Brady Duga, Carlsbad, CA (US); Ken Fishkin, Seattle, WA (US); Anuj Gujar, Mountain View, CA (US); Will Leschner, Carlsbad, CA (US); John Rivlin, Palo Alto, CA (US); Zhen Tao, Union City, CA (US)

(73) Assignee: Gemstar EBook Group Limited, Los Angeles, CA (US)

( * ) Notice: Subject to any disclaimer, the term of this patent is extended or adjusted under 35 U.S.C. 154(b) by 700 days.

(21) Appl. No.: 10/112,086

(22) Filed: Mar. 28, 2002

(65) Prior Publication Data

US 2003/0069812 A1     Apr. 10, 2003

Related U.S. Application Data

(60) Provisional application No. 60/280,460, filed on Mar. 30, 2001, provisional application No. 60/280,461, filed on Mar. 30, 2001, provisional application No. 60/280,459, filed on Mar. 30, 2001, provisional application No. 60/280,458, filed on Mar. 30, 2001, provisional application No. 60/280,456, filed on Mar. 30, 2001, now abandoned.

(51) Int. Cl.
    G06F 17/30        (2006.01)
(52) U.S. Cl. .......................................... 705/27; 705/26
(58) Field of Classification Search .................. 705/26, 705/27; 709/203, 248
    See application file for complete search history.

(56) References Cited

U.S. PATENT DOCUMENTS

| 3,718,906 | A | 2/1973 | Lightner |
| 4,159,417 | A | 6/1979 | Rubincam |
| D276,626 | S | 12/1984 | Lockwood |
| 4,490,810 | A | 12/1984 | Hon |
| 4,545,023 | A | 10/1985 | Mizzi |
| 4,575,621 | A | 3/1986 | Dreifus |

(Continued)

FOREIGN PATENT DOCUMENTS

EP        0390611        10/1990

(Continued)

OTHER PUBLICATIONS

Petreley, Nicholas, "The Softbook electronic document reader is so fun that it's hard to put it down", Infoworld Nov. 16, 1998.*

(Continued)

*Primary Examiner*—Mark Fadok
(74) *Attorney, Agent, or Firm*—Ropes & Gray LLP

(57) ABSTRACT

Systems and methods for facilitating electronic transactions via a device capable of communicating with a network. The method includes providing a catalog on the network and communicating with the network via the device. The catalog is downloaded to the device and communication is discontinued with the network via the device. At least one desired transaction within the catalog is selected and stored on the device. The device recommunicates with the network and the at least one desired transaction is completed.

20 Claims, 11 Drawing Sheets

U.S. PATENT DOCUMENTS

| | | | |
|---|---|---|---|
| 4,591,974 A | 5/1986 | Dornbush et al. | |
| 4,597,058 A | 6/1986 | Izumi et al. | |
| 4,601,011 A | 7/1986 | Grynberg | |
| 4,649,499 A | 3/1987 | Sutton et al. | |
| D289,777 S | 5/1987 | Thomas | |
| 4,682,161 A | 7/1987 | Bugg | |
| 4,725,977 A | 2/1988 | Izumi et al. | |
| 4,779,080 A | 10/1988 | Coughlin et al. | |
| 4,820,167 A | 4/1989 | Nobles et al. | |
| 4,855,725 A | 8/1989 | Fernandez | |
| 4,899,292 A | 2/1990 | Montagna et al. | |
| 4,916,441 A | 4/1990 | Gombrich | |
| 4,918,632 A | 4/1990 | York | |
| 4,972,496 A | 11/1990 | Sklarew | |
| 4,985,697 A | 1/1991 | Boulton | |
| 5,021,789 A | 6/1991 | Shaw | |
| 5,025,373 A | 6/1991 | Keyser, Jr. et al. | |
| 5,029,789 A | 7/1991 | Nourry et al. | |
| 5,031,119 A | 7/1991 | Dulaney et al. | |
| 5,065,345 A | 11/1991 | Knowles et al. | |
| 5,091,939 A | 2/1992 | Cole et al. | |
| 5,109,354 A | 4/1992 | Yamashita et al. | |
| 5,115,508 A | 5/1992 | Hatta | |
| 5,121,492 A | 6/1992 | Saville, III et al. | |
| 5,133,076 A | 7/1992 | Hawkins et al. | |
| 5,146,552 A | 9/1992 | Cassorla et al. | |
| D330,544 S | 10/1992 | Kane | |
| 5,157,491 A | 10/1992 | Kassatly | |
| 5,157,737 A | 10/1992 | Sklarew | |
| 5,157,783 A | 10/1992 | Anderson et al. | |
| 5,199,104 A | 3/1993 | Hirayama | |
| 5,203,001 A | 4/1993 | Yanagiuchi et al. | |
| 5,214,696 A | 5/1993 | Keiser, II et al. | |
| 5,221,838 A | 6/1993 | Gutman et al. | |
| 5,222,136 A | 6/1993 | Rasmussen et al. | |
| 5,226,080 A | 7/1993 | Cole et al. | |
| 5,231,662 A | 7/1993 | Van Rumpt et al. | |
| 5,233,333 A | 8/1993 | Borsuk | |
| 5,239,665 A | 8/1993 | Tsuchiya | |
| D339,329 S | 9/1993 | Lacko | |
| 5,245,656 A | 9/1993 | Loeb et al. | |
| 5,247,661 A | 9/1993 | Hager et al. | |
| 5,253,294 A | 10/1993 | Maurer | |
| D346,620 S | 5/1994 | McSorley | |
| 5,319,582 A | 6/1994 | Ma | |
| 5,333,116 A | 7/1994 | Hawkins et al. | |
| 5,339,091 A | 8/1994 | Yamazaki et al. | |
| 5,359,707 A | 10/1994 | Sato | |
| 5,365,598 A | 11/1994 | Sklarew | |
| 5,367,621 A | 11/1994 | Cohen et al. | |
| 5,379,057 A | 1/1995 | Clough et al. | |
| 5,388,196 A | 2/1995 | Pajak et al. | |
| 5,392,387 A | 2/1995 | Fitzpatrick et al. | |
| 5,398,310 A | 3/1995 | Tchao et al. | |
| 5,404,505 A | 4/1995 | Levinson | |
| D359,306 S | 6/1995 | Lande et al. | |
| 5,428,606 A | 6/1995 | Moskowitz | |
| 5,438,344 A | 8/1995 | Oliva | |
| D362,271 S | 9/1995 | Luong | |
| D362,272 S | 9/1995 | Luong | |
| D362,461 S | 9/1995 | Luong | |
| 5,457,746 A | 10/1995 | Dolphin | |
| 5,463,725 A | 10/1995 | Henckel et al. | |
| 5,465,213 A | 11/1995 | Ross | |
| 5,467,102 A | 11/1995 | Kuno et al. | |
| 5,475,399 A | 12/1995 | Borsuk | |
| 5,477,510 A | 12/1995 | Ukita | |
| 5,483,586 A | 1/1996 | Sussman | |
| 5,485,176 A | 1/1996 | Ohara et al. | |
| 5,598,470 A | 1/1997 | Cooper et al. | |
| 5,615,264 A | 3/1997 | Kazmierczak et al. | |
| 5,629,980 A | 5/1997 | Stefik et al. | |
| 5,638,443 A | 6/1997 | Stefik et al. | |
| 5,661,635 A * | 8/1997 | Huffman et al. | 361/684 |
| 5,668,592 A * | 9/1997 | Spaulding, II | 725/134 |
| 5,697,793 A | 12/1997 | Huffman et al. | |
| 5,719,943 A | 2/1998 | Amada et al. | |
| 5,734,823 A | 3/1998 | Saigh et al. | |
| 5,734,891 A | 3/1998 | Saigh | |
| 5,737,619 A | 4/1998 | Judson | |
| 5,761,485 A * | 6/1998 | Munyan | 715/839 |
| 5,799,157 A | 8/1998 | Escallon | |
| 5,819,032 A | 10/1998 | De Vries et al. | |
| 5,909,690 A | 6/1999 | Tanigawa et al. | |
| 5,926,624 A * | 7/1999 | Katz et al. | 709/217 |
| 5,956,034 A | 9/1999 | Sachs et al. | |
| 5,957,697 A | 9/1999 | Iggulden et al. | |
| 5,978,381 A | 11/1999 | Perlman et al. | |
| 6,108,703 A | 8/2000 | Leighton et al. | |
| 6,125,388 A | 9/2000 | Reisman | |
| 6,134,591 A | 10/2000 | Nickles | |
| 6,195,667 B1 * | 2/2001 | Duga et al. | 715/513 |
| 6,212,634 B1 * | 4/2001 | Geer et al. | 713/156 |
| 6,314,474 B1 * | 11/2001 | Walter et al. | 710/14 |
| 6,331,865 B1 * | 12/2001 | Sachs et al. | 715/776 |
| 6,332,134 B1 * | 12/2001 | Foster | 705/36 R |
| 6,363,418 B1 * | 3/2002 | Conboy et al. | 709/218 |
| 6,493,734 B1 * | 12/2002 | Sachs et al. | 715/526 |
| 6,519,627 B1 * | 2/2003 | Dan et al. | 709/203 |
| 6,549,917 B1 * | 4/2003 | Pollard et al. | 707/201 |
| 6,779,042 B1 * | 8/2004 | Kloba et al. | 709/248 |
| 7,028,267 B1 * | 4/2006 | Beezer et al. | 715/802 |
| 7,133,837 B1 * | 11/2006 | Barnes, Jr. | 705/26 |
| 7,171,692 B1 * | 1/2007 | DeMello et al. | 726/26 |
| 2002/0174145 A1 * | 11/2002 | Duga et al. | 707/513 |
| 2006/0069712 A1 * | 3/2006 | Anders et al. | 709/201 |

FOREIGN PATENT DOCUMENTS

| | | |
|---|---|---|
| EP | 0 460 869 | 12/1991 |
| EP | 0760505 | 3/1997 |
| EP | 0821315 | 1/1998 |
| FR | 2657187 | 7/1991 |
| FR | 2657451 | 7/1991 |
| GB | 2149544 | 6/1985 |
| GB | 2353624 A * | 2/2001 |
| JP | 02-206817 | 8/1990 |
| JP | 04-160618 | 6/1992 |
| JP | 05-250268 | 9/1993 |
| JP | 06-231112 | 8/1994 |
| JP | 08-008850 | 1/1996 |
| WO | WO 87/01481 | 3/1987 |
| WO | WO 89/05023 | 6/1989 |
| WO | WO 90/07157 | 6/1990 |
| WO | WO 97/20274 | 6/1997 |
| WO | WO 97/22109 | 6/1997 |
| WO | WO 98/08344 | 2/1998 |
| WO | WO 98/10806 | 4/1998 |

OTHER PUBLICATIONS

PrNewsWire, "New company Xenote allows consumers to 'bookmark the real world' with fun, personal internet device", Jan. 25, 2000.*

Emedialive, http://www.emedialive.com/awards, Jul 15, 2002.

Algre, "A PC-Based Real-Tiime Multimedia Tele-Education System," Proceedings of the Global telecommunications Conference (Globecom), pp. 881-885, IEEE, 1994.

Gold, "The online eye - Push is nothing new," Newsbytes News Network, Mar. 17, 1997.

Schilit et al., "Beyond Paper: Supporting Active Reading With Free Form Digital Ink Annotations," Chi Conference Proceedings, Human Factors In Computing Systems, ACM, pp. 249-256, 1998.

Hakozaki et al., "Conceptual Design Of A Virtual Library For Personal Use," Systems & Computers In Japan, Scripta Technica Journals, vol. 30, No. 3, pp. 43-51, Mar. 1999.

Newsletter: "Push technologies will turn the web into a friendlier consumer experience, widening its overall appeal," Interactive Consumers, p. 6, Dec. 1996.

Kanellos, "Paperclip aims immage-managenet products at internet," Resellers News, No. 712, p. 94, Nov. 12, 1996.

Gustavson, "Market Scape WebCD Pro Publisher," Dec. 1997.

Gold, "Evolution's offline web browswer technology," Newsbytes News Network, Aug. 29, 1996.

Fontana, "If your web site bandwith is constrained, try using CD's," Internetweek.com, Aug. 29, 1997.

Nearsite, "Create Custom Web Channels with NearSite Pull Technology," Apr. 18, 1997.

Internova, "Internova Announces InstarMobil Internova Delivers the First Mobile Commerce Application for E-Business," Jul. 18, 2000.

Business Insites, "ucatalogTM Revolutionizes Interactive CD-Rom Shopping," Oct. 31, 2000.

Dvorak, et al.; "A Methodology for User centered Link Structure for Textbook to Hypertext Conversion" IEEE Jan. 1992, pp. 619-628.

Pobiak "Adjustable Access Electronic Books", IEEE, Jan. 1992, pp. 90-94.

Tony Ramos, "Making Book on Electronic Books" College Store Journal- Sep./Oct. 1992.

Electronic Campus, The Wall Street Journal-Jun. 1, 1993.

Watanabe, et al., "Visual Interface for Retrieval of Electronic-formed Books" IEEE Jul. 1993, pp. 692-695.

The Heller Report-Oct. 1993.

IBM To Unveil Plan Top Skip Disks, Send Software By Satellite, The Wall Street Journal-Nov. 1, 1994.

This Little Computer Tries To Be A Book, St. Louis Post-Dispatch, Jan. 4, 1995. Now, Data By Satellite (no date).

* cited by examiner

American Psycho
Bret Easton Ellis

List Price: $11.20
Our Price: $8.40
You Save: $2.00 (20%)

| AMERI-CAN PSYCHO BRET EASTON ELLIS |

Random House, October 31, 1999
eBook Published: March, 2000

Bret Easton Ellis imaginatively explores the incomprehensible depths of madness and captures the insanity of violence in our time or any other. Patrick Bateman moves among the young and trendy in 1980s Manhattan. Young, handsome, and well educated, Bateman earns his fortune on Wall Street by day while spending his nights in ways we cannot begin to fathom. Expressing his true self through torture and murder, Bateman prefigures an apocalyptic horror that no society could bear to confront. 

*FIG. 3.*

Homeplace, The
*Janet Dailey*

Random House

Every novel in this collection is your passport to a romantic tour of the United States through time-honored favorites by America's First Lady of romance fiction.

Price: $5.50  List Price: $6.99  You Save: $1.49 (20%) 

*FIG. 4.*

Time

In-depth weekly news coverage.

Individual Issues

Current Issue: Monday, Apr. 17, 2000
4 back issues available.
Price: $2.50/issue     List Price: $3.50/Issue     You Save: $1.00 (28%)

Current Issue - Monday, April 17, 2000 ──────── (order)

Monday, April 1, 1999 ──────── (order)

Monday, March 30, 1999 ──────── (order)

Monday, March 1, 1999 ──────── (order)

Monday, February 27, 1999 ──────── (order)

Subscriptions

One Year Subscription-
Price: $49.95   List Price: $70.00   You Save: $20.05 (28%)   (order)

Six Month Subscription-
Price: $24.95   List Price: $35.00   You Save: $10.05 (28%)   (order)

Three Month Subscription-
Price: $12.95   List Price: $17.50   You Save: $4.55 (26%)   (order)

start with   ⦿ current issue  ◉ next issue

*FIG. 5.*

Time

In-depth weekly news coverage.

Individual Issues
Current Issue Only
Price: $2.50/issue       List Price: $3.50/Issue    You Save: $1.00 (28%)

(order)

Ongoing Subscriptions
Starting with Current Issue, billed on a monthly basis
Price: $12.95   List Price: $17.50  You Save: $4.55 (26%)

(order)

| CONTENTS | ORDER FORM |

What's New: Index Listing

Homeplace, The
*Janet Dailey*

Every novel in this collection is your passport to a romantic tour of the United States through time-honored favorites by America's First Lady of romance fiction.

Price: $5.50     List Price: $6.99   You Save: $1.49 (20%)     (order)

Julius Caesar
*William Shakespeare*

SoftBook Classics

Price: $3.99     List Price: $5.00   You Save: $1.01 (20%)     (order)

The Face of Our Past
*Kathleen Thompson*

Featured on "Oprah", this book tells the story of black women throughout the history of the United States.

Price: $20.00     List Price: $35.00 You Save: $15.00 (40%)     (order)

Fight Fat After Forty
*Pamela Peeke*

Fat is a problem that gets more difficult as the body ages. In Fight Fat Over Forty, Pamela Peeke shows us how to lose those toxic extra pounds. Stop eating and wrap yourself in Saran for 10 days...

Price: $17.46     List Price: $29.95 You Save: $12.49 (40%)     (order)

Truth at Any Cost
*Susan Schmidt, Michael Weisskopf*

A straightforward telling (is there such a thing?) of the Lewinsky scandal that rocked the Clinton administration.

Price: $18.20     List Price: $26.00 You Save: $7.80 (30%)     (order)

What's New

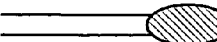

end

*FIG. 8.*

SillyBalls eBookstore CATALOG     Table of Contents     order form

- ✎ Highlights
- *e* eExclusives (9 titles)
- ☑ Periodicals (116 titles)
- ☑ Technical Reports and Studies (8 titles)
- ☐ Arts & Music (32 titles)
- ☐ Biographies & Memoirs (315 titles)
- ☐ Books in Foreign Language (54 titles)
- ☐ Business & Investing (265 titles)
- ☐ Children's Books (204 titles)
- ☐ Christian Books (47 titles)
- ☐ Computers & Internet (61 titles)
- ☐ Contemporary Fiction (449 titles)
- ☐ Cooking, Food & Wine (14 titles)
- ☐ Drama (80 titles)
- ☐ English & American Literature (899 titles)
- ☐ Entertainment (11 titles)
- ☐ Health, Mind & Body (138 titles)

SYSTEMS AND METHODS FOR ELECTRONIC OFF-LINE CATALOG

CROSS-REFERENCES TO RELATED APPLICATIONS

This application claims priority from U.S. Provisional Application No. 60/280,460 filed Mar. 30, 2001; No. 60/280,461 filed Mar. 30, 2001; No. 60/280,459 filed Mar. 30, 2001; No. 60/280,458 filed Mar. 30, 2001 and No. 60/280,456 filed Mar. 30, 2001, which are all incorporated herein in their entireties by reference purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

1. Field of the Invention

The present invention relates to systems and methods for an electronic off-line catalog, and more particularly, to a catalog of electronic books, the catalog may be downloaded to an electronic device and then accessed while the electronic display device is off-line, with transactions, such as purchases, being fulfilled and updates occurring when the electronic device is back on line.

2. Description of the Prior Art

Many items are currently available for purchase over networks such as the internet. Generally, when one wishes to purchase items over the internet, one goes to a website or location that generally includes a catalog. The catalog is viewed and selections are made while the person is on-line and at the website. Typically, on-line catalogs are only available for PCs or other platforms with browser-based environments.

If the catalog is large and has many choices, it may be time consuming to browse through the catalog. This could mean tying up one's internet connection, often a telephone line.

Furthermore, on-line catalogs may or may not change frequently. Often, even when the on-line catalog changes, the changes are minor.

Accordingly, it is desirable to have access to a catalog when one is actually off-line. This would allow a user to peruse the catalog at their leisure without tying up an internet connection and/or telephone line. Additionally, the user would have access to the catalog even if access to the internet is not available.

BRIEF SUMMARY OF THE INVENTION

The present invention provides a method for facilitating electronic transactions via a device capable of communicating with a network. The method includes providing a catalog on the network and communicating with the network via the device. The catalog is downloaded to the device and the network connection is terminated. At least one desired transaction within the catalog is selected (e.g. an item is marked for purchase) and the transaction stored on the device. The device recommunicates with the network and at least one desired transaction is completed (e.g. a purchase is completed, or a purchased item is downloaded to the device).

In accordance with one aspect of the present invention, multiple desired transactions are selected.

In accordance with another aspect of the present invention, the catalog includes multiple sections and a user selects which sections to download, add or update.

In accordance with a further aspect of the present invention, the catalog is updated when the device recommunicates with the network.

In accordance with yet another aspect of the present invention, updating the catalog includes the device requesting a catalog update from a version of the catalog stored on the network. All changes made to the network catalog since the last time the catalog on the device was updated are identified by the network and downloaded to the device. Only the updated content is downloaded from the network and the version of the catalog on the device is updated to create an up to date version of the catalog on the device.

In accordance with a further aspect of the present invention, the updating occurs automatically.

In accordance with another aspect of the present invention, the updating occurs aperiodically.

In accordance with yet another aspect of the present invention, the device recommunicates with the network automatically.

In accordance with a further aspect of the present invention, the device recommunicates with the network manually due to a user request or user interaction.

The present invention also provides an electronic transactions system that includes a network, a device capable of communicating with the network, and a catalog representing a plurality of possible transactions. The catalog is downloaded to the device from the network. A desired transaction is indicated using the catalog when the device is not in communication with the network. The desired transaction is completed when the device subsequently communicates with the network.

In accordance with one aspect of the present invention, the device is an electronic book.

Accordingly, the present invention provides systems and methods for an electronic catalog that may be obtained from a network and viewed while off line with the network. Transactions may be initiated off-line with the catalog and are completed when back on line with the network. The present invention allows for the catalog to be customized to a user's preferences and may be updated when communication with the network is reestablished. The off-line catalog in accordance with the present invention is especially suited for stand-alone devices.

Other features and advantages of the present invention will be understood upon reading and understanding the description of the preferred exemplary embodiments, found hereinbelow, in conjunction with reference to the drawings, in which like numerals represent like elements.

BRIEF DESCRIPTION OF THE DRAWINGS

FIG. 3 is an example of a screen display for a promotional feature listing format for a catalog in accordance with the present invention;

FIG. 4 is an example of a screen display for an index listing format for a catalog in accordance with the present invention;

FIG. 5 is an example of a screen display for aperiodical listing format for a catalog in accordance with the present invention;

FIG. 7 is an example of a screen display for an order form for a catalog in accordance with the present invention;

FIG. 8 is an example of a screen display for a "What's New" index listing for a catalog in accordance with the present invention;

FIG. 9 is an example of a screen display for a Table of Contents for a catalog in accordance with the present invention;

DESCRIPTION OF SPECIFIC EXEMPLARY EMBODIMENTS

The present invention is directed to a catalog that is downloadable from a network such as, for example, the internet. It is especially suitable for electronic books, and systems and methods related thereto that are described, for example, in the present assignee's copending patent application Ser. No. 09/419,554, and issued U.S. Pat. No. 6,275,934, both of which are hereby incorporated herein in their entireties for all purposes. While for clarity, the present invention will be described with reference to electronic books, and systems and methods related thereto, those skilled in the art will understand that the present invention may be used for various other applications, and hence should not be unduly limited.

Portable Electronic Devices Such As E-Book Readers

Figure 1:
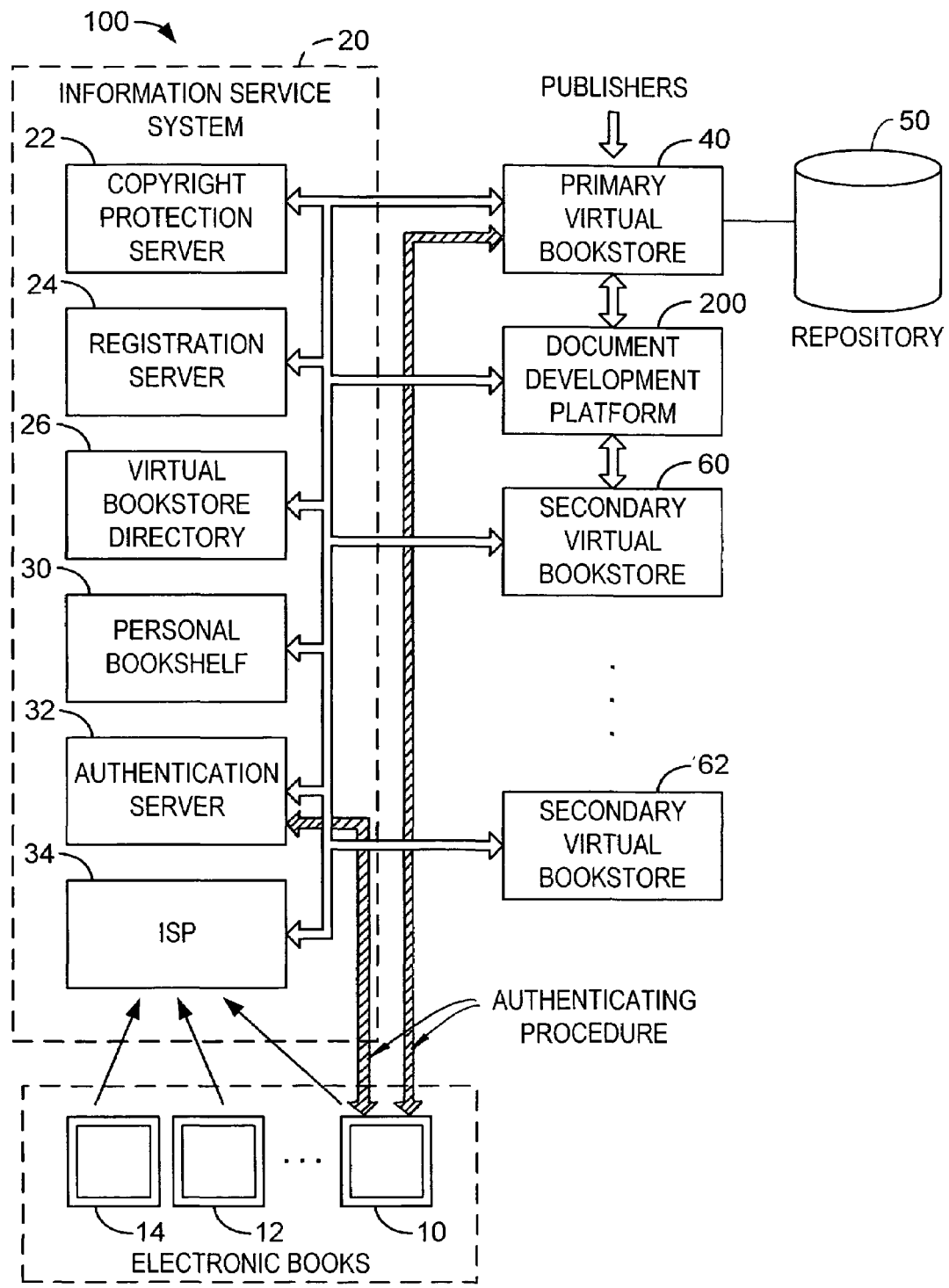
FIG. 1 is a diagram illustrating a system in which one embodiment of the invention can be practiced.

Referring to FIG. 1, system 100, which is only an exemplary embodiment, includes: (a) at least one portable electronic book 10 operative to request a digital content from a catalog of distinct digital contents, to receive and display the requested digital content in readable form; (b) an information services system 20 which includes an authentication server 32 for authenticating the identity of the requesting portable electronic book 10 and a copyright protection server 22 for rendering the requested digital content sent to the requesting portable electronic book 10 readable only by the requesting portable electronic book 10; (c) at least one primary virtual bookstore 40 in electrical communication with the information services system 20, the primary virtual bookstore being a computer-based storefront accessible by the portable electronic book and including the catalog of distinct digital contents; and (d) a repository 50, in electrical communication with the primary virtual bookstore 40, for storing the distinct digital contents listed in the catalog.

System 100 preferably includes more than one portable electronic book 10, to be commercially viable. This is illustrated in FIG. 1 by including the portable electronic books 12 and 14. The system also preferably includes more than one primary virtual bookstore 40, each serving a different set of customers, each customer owning a portable electronic book.

In one embodiment of the invention, system 100 further comprises a secondary virtual bookstore 60 in electrical communication with the information services system 20. In this case, the information services system 20 also includes a directory of virtual bookstores 26 in order to provide the portable electronic book 10 with access to the secondary virtual bookstore 60 and its catalog of digital contents.

The information services system 20 also includes a registration server 24 for keeping track of the portable electronic books that are considered active accounts in the system and for ensuring that each portable electronic book is associated with a primary virtual bookstore in the system.

The information services system 20 preferably includes a local bookshelf 30 associated with each portable electronic book 10 in the system. Each local bookshelf 30 contains all digital contents requested and owned by the associated portable electronic book 10. Each portable electronic book 10 user may permanently delete any of the owned digital contents from the associated local bookshelf 30. Since the local bookshelf 30 contains all the digital contents owned by the associated portable electronic book 10, these digital contents may have originated from different virtual bookstores. The local bookshelf 30 is a storage extension for the portable electronic book 10. Such storage extension is needed since the portable electronic book 10 generally has limited nonvolatile memory capacity.

The user of the portable electronic book 10 may add marks, such as bookmarks, inking, highlighting and underlining, and annotations on a digital content displayed on the screen of the portable electronic book, then stores this marked digital content in the nonvolatile memory of the electronic book 10. The user may also upload this marked digital content to the information services system 20 to store it in the centralized bookshelf 30 associated with the portable electronic book 10, for later retrieval. It is noted that there is no need to upload any unmarked digital content, since it was already stored in the local bookshelf 30 at the time it was first requested by the portable electronic book 10.

The information services system 20 further includes an Internet Services Provider (ISP) 34 for providing Internet network access to each portable electronic book in the system.

FIG. 1 further illustrates that the electronic book 10 interacts with the authenticating server 32 and the primary virtual bookstore 40 for authentication of information exchange. In this scenario, the electronic book 10 is a guest and the primary virtual bookstore is a host. The authentication is carried out over the communication network provided by the ISP 34.

Figure 2:
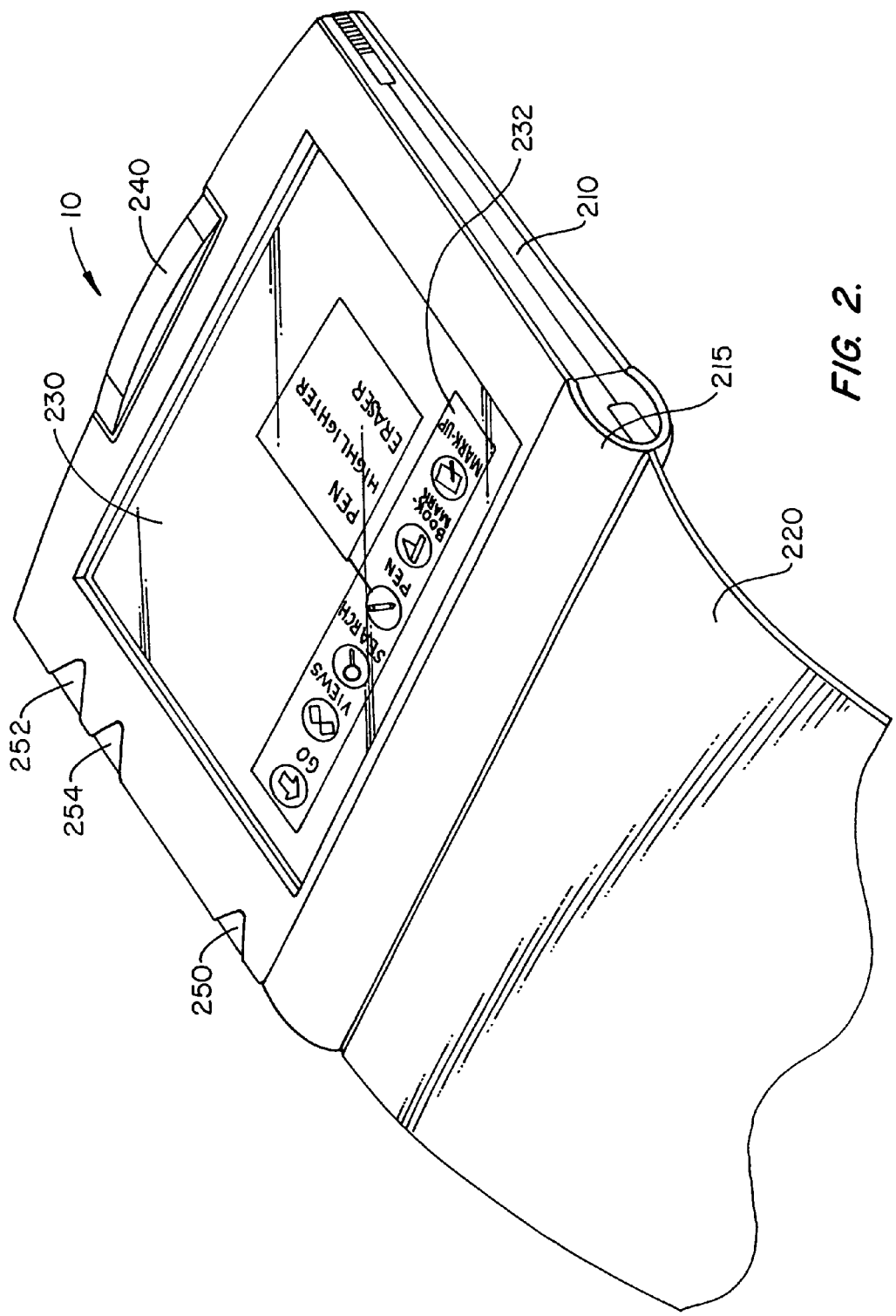
FIG. 2 is an elevation view of an example of an electronic book/reading device that may be used with the present invention.

FIG. 2 illustrates an example of an electronic book/reading device 10. The electronic book includes a housing 210, a battery holder 215, a cover 220, a display screen 230, a page turning mechanism 240, a menu key 250, a bookshelf key 252, and a functional key 254.

The housing 210 provides overall housing structure for the electronic book. This includes the housing for the electronic subsystems, circuits, and components of the overall system. The electronic book is intended for portable use; therefore, the power supply is mainly from batteries. The battery holder 215 is attached to the housing 210 at the spine of the electronic book 10. Other power sources such as AC power can also be derived from interface circuits located in the battery holder 215. The cover 220 is usually made by flexible material and is attached to the housing 210. The cover is used to protect the viewing area 230.

The display screen 230 provides a viewing area for the user to view the electronic reading materials retrieved from the storage devices or downloaded from the communication network. The display screen 230 may be sufficiently lit so that the user can read without the aid of other light sources. When the electronic book is in use, the user interacts with the electronic book via a soft menu 232. The soft menu 232 displays icons allowing the user to select functions. Examples of these functional icons include go, views, search, pens, bookmarks, markups, and close. Each of these icons may also include additional items. These additional items are displayed in a drop-down tray when the corresponding functional icon or key is activated by the user. An example of a drop-down tray is the pens tray which includes additional items such as pen, highlighter, and eraser. In one embodiment, the soft menu 232 may be updated dynamically and remotely via the communication network.

The page turning mechanism 240 provides a means to turn the page either backward or forward. The page turning mechanism 240 may be implemented by a mechanical element with a rotary action. When the element is rotated in one direction, the electronic book will turn the pages in one direction. When the element is turned in the opposite direction, the electronic book will also turn in the opposite direction. The page turner mechanism 240 may also be used as a latch to hold the cover 220 in place when the electronic book is closed.

The menu key 250 is used to activate the soft menu 232 and to select the functional icons. The bookshelf key 255 is used to display the contents stored in the bookshelf and to activate other bookshelf functions. The functional key 254 is used for other functions.

The electronic book 10 includes a view switching feature that allows readers or users to increase or decrease the size of the font used to create page display images to suit the preferences of the readers or users. As stated previously, a page display image is an arrangement of pixels on a display screen or an output device to create a visual representation of a page of reading material. Each set of page display images of an electronic publication, document, or reading material that is generated using a set of view parameters is referred to as a page display view. View parameters may include the point size of the font that should be used to create page display images. View parameters may also include the dimensions of a display screen or a portion of a display screen of the electronic book where page display images are presented.

Electronic book 10 preferably supports two different page display views such that page display images of the first view are generated using a smaller font than page display images of the second view. In practice, the electronic book 10 can be constructed to support more than two different page display views.

Catalog Definitions

Catalog—The document that users download, through which they can order content.

Catalog Section—The Catalog is comprised of a number of Sections, e.g., table of contents, a "Featured" section, etc.

Asset—Something for sale. Catalog sections contain descriptions of which assets they offer for sale.

Template—Something that specifies the "look" of a particular portion of a catalog—a section header, an asset listing, etc.

Catalog Image—Catalogs have a set of images, images that are created especially for catalogs.

Catalog Creation

The "Structure" of a Catalog is the data associated with a catalog, without regard to how that data is presented visually: what sections are in the catalog, in what order, what the catalog should be called, etc. The Catalog structure is similar to a "tree." At the root of the tree is the "Catalog" item. Below that, there are two kinds of items: items which specify the "top-level" information about the catalog, for example, its name, and a set of Catalog sections. Each of those sections has two types of data associated with it: data that describes the Section itself (its name, etc.) and then the set of Catalog assets that are listed in that section. Finally, each asset may itself have various pieces of information associated with it how it should display itself, etc.

Preferably, each catalog includes a cover page and a Table of Contents (which might be multiple pages). FIG. 9 illustrates an example of a Table of Contents layout. Following these two sections, the catalogs will vary according to the customization parameters and based on which assets have been sent by the network (bookstore) to the device.

Preferably, a number of basic catalog "styles" are provided within the catalog, such as, for example, promotional features, index listings and periodical layouts. Combinations of these styles with a particular focus are used to create the final catalog.

The promotional featured items are particular assets selected from a database of available assets to be included in a "features" section. These featured assets may either be selected manually or automatically. For manual selection, a catalog creator may specify which assets are to be featured assets and the order in which they are to appear. Featured asset information may include, for example, the title, author, custom catalog description, thumbnail of the cover jacket or other photo artwork, publisher, publication date and e-book publish date, the current list price, the electronic book provider's price, and the savings if any. If there are no savings, the savings item will not appear at all. An example of a promotional feature listing is illustrated in FIG. 3.

For implementation, styles are preferably mapped into templates. In order to maximize flexibility and screen space utilization the Featured Title style may, in fact, map to several templates based on the size of the content item. For example, Featured Titles may consist of 3 template choices: "Full Page layout", "½ page layout", and "minimal layout".

The index listing format is an abbreviated summary of assets (titles) to maximize the number of items that may be included in a limited storage space. For this reason, index items preferably include, for example, the title, author, publisher, abbreviated or short description, list price, and the electronic book provider's price. An example of the index listing format is illustrated in FIG. 4.

The periodical style is specific to periodicals, newspapers or magazines. A sample listing is illustrated in FIG. 5.

As can be seen in the Figures, the styles are all preferably presented with an Order button that is visually similar in style to the current button options on an reading device. Items that have already been requested and added to an order may be indicated by changing the button label to "ordered". If the user taps the ordered button they should be taken to the order form showing the page on which that item is listed. "Back to Catalog" is preferably provided as a hot link to return them. If an item has not only been ordered, but the order form has been processed, then that item's button label may be set to "purchased."

Other sections may include "Bestsellers." The default is to include all books with the asset type of "bestseller" in the catalog database; however, the catalog author may alter the number of books included. "What's New" may be included and includes book and possibly periodicals that have most recently been added to the bookstore across all topic areas (See FIG. 8). The number of items featured may vary and may be determined by the catalog author who will determine the date range to use. "Periodicals" may include a listing of all the periodicals currently available with the option to order the current issue, whatever back issues are available, or to subscribe to the future issues. Users preferably may also renew subscriptions through the catalog. Items already ordered present the "order" button as a "renew" option for periodicals that for which the user already has a subscription. "All Titles by Category" may be included. This section contains an index listing of all titles organized by category and sorted by first author last name. "All Titles by Author" may also be included. This section preferably contains an index listing of all titles sorted by author's last name. Preferably there is an alphabetic index of hot links to facilitate navigation within this section.

Thus, a single catalog is available for an on-line bookstore. This single catalog is formatted with a number of sections, reflected in the Table of Contents of that particular catalog. The sections present different subsets of assets available by providing the user with different views. This is a single dynamic data set that is presented in differing ways (i.e., these sections are views or templates on a single database so there is maximal space efficiency). From the user's perspective this will appear as a single electronic book with multiple sections in that book. Assets may appear in multiple sections but in a different ordering and presentation. In a preferred embodiment, even though an asset may appear in multiple sections, the data describing the asset should only be stored once in the underlying data set as will be more fully explained herein.

Catalog Content

A catalog will generally have a maximum size for obvious reasons (e.g. storage constraints on the device, or network bandwidth constraints on catalog download). In order to ensure that the most useful information is included, catalogs will eliminate the least popular items when they exceed the maximum permitted size. In particular, items will be included according to the following criteria: Features—Items marked by the catalog creator/author to be featured in that catalog for a particular time frame will automatically be guaranteed a place; Most recent—Items that have become available most recently in time based on the current date; Most sales—Items that have generated the largest volume of sales since their availability will be included; Not already purchased by the user; and, Some items may be offered at certain prices for "limited time offers". In this case an "expiration date" can be set for that item to be featured or for a particular price to be included. Once expired, an item can be automatically removed from the feature list and/or an item price can be automatically reset. Those skilled in the art will understand that the above described process and criteria are merely exemplary and other variants may be used.

The intent is to set a maximum number of items to be included, for example 5000. To determine the items to be included some percentage will be allocated to most recently available items. This will be independent of the sales figures for these items since new acquisitions will initially have 0 sales and may take several days or even weeks to attain significant sales volumes. Secondly, the remaining percentage of the total will be allocated to the items with the highest total sales volume, which will be used as a rough measure of popularity.

On a per user basis, items that a particular user has already purchased may be eliminated from the catalog listings to maximize visibility of new items for that particular person.

With the present invention, inclusion criteria are used so that an asset is only downloaded or transmitted to the reading device once, even if it appears multiple times in the catalog. For each section, the network looks at the inclusion criteria to see which assets go into that section. These assets are all pooled into an internal data set, so that even if an asset is in eight different sections, it only occupies storage once in the data set, but with an annotation that indicates which eight sections requested it.

Once the network knows the set of assets, it looks to see which images are necessary. Only a small subset of the asset images are sent (e.g., only those images that are referenced by featured or bestsellers assets, identified by templates, are included). This helps minimize the size of the download.

New Users

Preferably, purchasers of a reading device will automatically receive a catalog by default. They can then choose to continue with their subscription, customize their catalog, stop their subscription (i.e., block future updates), or remove the catalog from their device's local bookshelf altogether.

Initially when users receive a brand new reading device, they will preferably receive a hidden catalog. The catalog will be loaded on the device but preferably will not initially be accessible or visible to the user. Since reading devices can remain in inventory for some period of time it is possible or even likely that this catalog will be out of date or the pricing information may have been modified. Downloading the entire catalog rather than merely updating the items that have changed is extremely time consuming and would require an extended network connection, which is unacceptable from a user experience perspective. Therefore, it is preferable to initially load the catalog when the device receives its original software during manufacturing, but mark the catalog as "hidden" or invisible content until the user registers the device, i.e., the device is purchased and activated. At this time the catalog may be updated based on the latest available information and it will be activated and hence visible. This will ensure a minimal amount of connect time while guaranteeing that the users will see accurate pricing and title information in catalogs provided to them when they first purchase a reading device.

Figure 6:
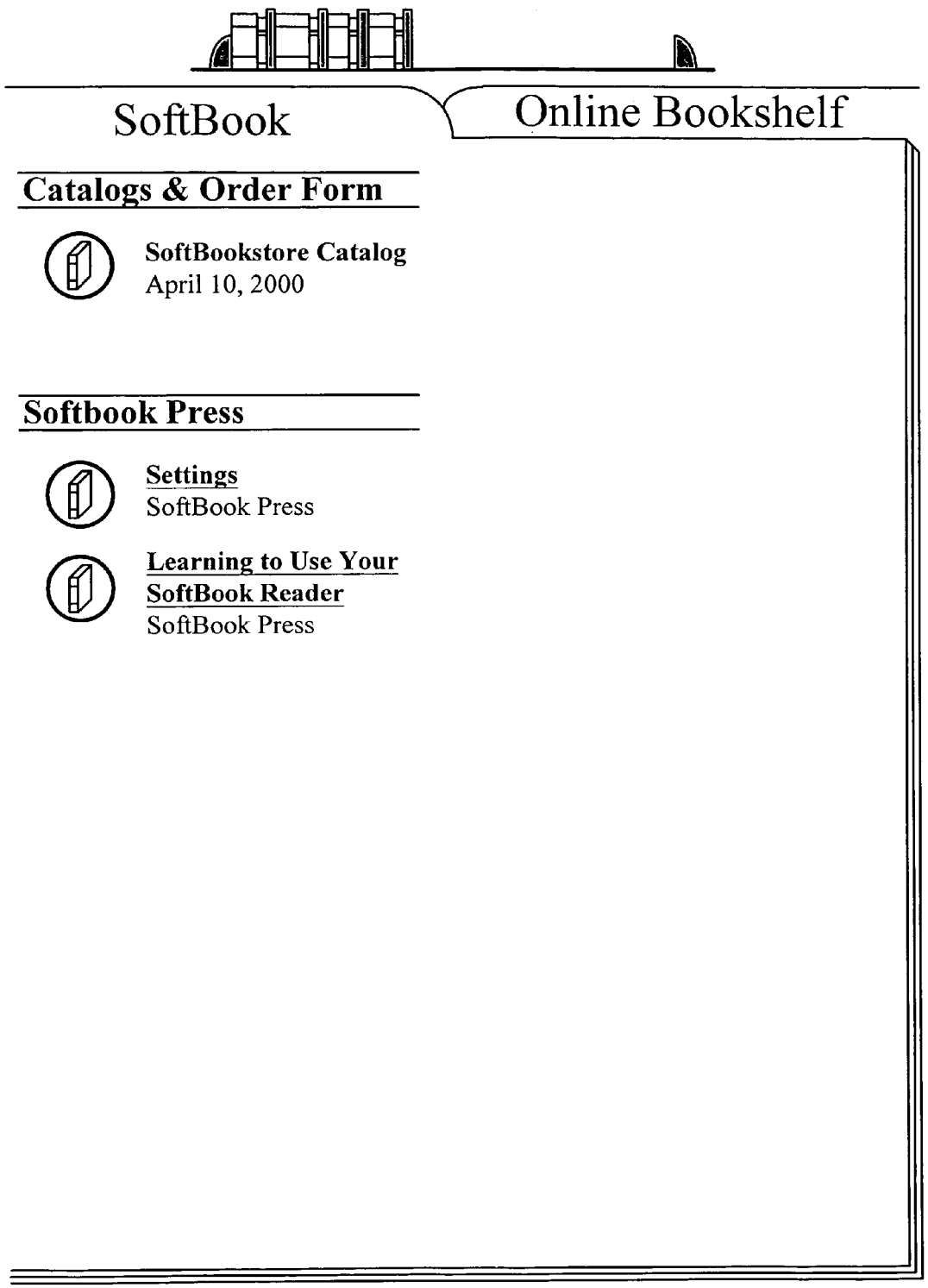
FIG. 6 is an example of a screen display for a catalog after registration is complete in accordance with the present invention.

In practice the following steps will occur. Upon registration—which preferably will always occur automatically the very first time the user connects to a network—users will be asked to enter their registration information. Following this, users will see a message indicating that they are being registered, followed by a message indicating that they are receiving our latest catalog of available titles, special offers, etc. During this brief time interval, the database is updated on the local device with any information that has changed since the device received its software. When registration and catalog updating are completed, the user sees a new category item called "Catalogs" on their local bookshelf with the new catalog. (See FIG. 6).

Updating and Customizing the Catalog

Preferably, a user may either automatically receive the catalog from the network or may receive it upon request from the online bookstore. Preferably, the off-line catalog may not have its subscription canceled. If it exists on the local bookshelf, then the updates will occur whenever a connection is made. Alternatively, users may opt to remove it from their reading device (preferably with a warning message). It will still remain on the online bookshelf where it cannot be removed. If re-requested by the user, when downloaded the latest information updates will also be retrieved from the bookstore.

Preferably, to generate new content for catalogs, the bookstore administrator may access the bookstore and modify the existing catalog and save it. These "updates" are preferably done automatically when the reader communicates with the server. Updating is preferably done by comparing the most recent update date of the catalog on the device with the update date of each piece of information on the server. Only those portions of the catalog on the server that are different are then downloaded to replace the corresponding portions of the catalog on the reader.

When a connection to the network occurs for a catalog update, the reading device relays (a) which catalog it wants, (b) which catalog sections it wants, and (c) how old its existing catalog is with a time stamp parameter. The network then looks at a Catalog Item table, which includes all catalog items arranged chronologically, and the network sends all the items that are newer than the existing time stamp for the existing catalog.

As an example, assume there are 300 items that need to be sent, and the device can only handle 50 in a single "chunk." This means that if the current time stamp is S, then the network needs to send a new time stamp value of "S+50." However, the value of the new time stamp comes at the top of the packet that the network sends to the device. This means that the network needs to do two passes through the Catalog Item table—one to figure out what the next time stamp will be and one to send everything up to that time stamp.

Because of selective section inclusion, this is now a two-segment process. Suppose that a device connects with a catalog that is 2 weeks old, and they want 3 new sections for the first time ever. Before giving them a "here is what's new from the last 2 weeks" update, the network needs to give them a "here are the 3 new sections" update.

There are considerations in addition to the time stamp in selecting the information to transmit and order of updates. Consider the following: many items may share the same time stamp. For example, all assets that have never changed may have a time stamp of Jan. 1, 1970. A "tie-breaker" needs to be provided. Preferably, there are two levels of tiebreaker. Firstly, there is a "priority", with higher priority items being sent first. For example, a section definition needs to be sent before any attributes for that section are sent. Secondly, within that, the ID of the Catalog Item in the database needs to be sent.

Sometimes it may be desirable to ignore the existing time stamp, to just send everything and do a complete download. This is mainly done when debugging the off-line catalog. Therefore, one of the attributes of a time stamp is a "cliff." If a time stamp comes in and it has a "cliff" that is less than the current "cliff" for that catalog, then the time stamp is ignored, and a complete download is done.

Updating may be a two-pass process, because of catalog selective inclusion and exclusion. That means that the time stamp really needs to contain two "mini time stamps" one to indicate the processing pass, and one to indicate progress within that pass.

Customizing a catalog is preferably accomplished by navigating to the Table of Contents section of the catalog and selecting the desired sections of the catalog by checking or un-checking the desired sections to include or exclude from the catalog. In this way, users may add and delete, for example, sections that will be included in their off-line catalog.

User customizations to the catalog are preferably done on the local catalog version that exists on the local bookshelf on the reader, i.e., the off-line version. The on-line bookshelf version of the catalog remains unchanged. Users may easily get back to the original catalog by pressing the download catalog option (in addition to also being able to simply reset their customization to include all content types).

Figure 11:
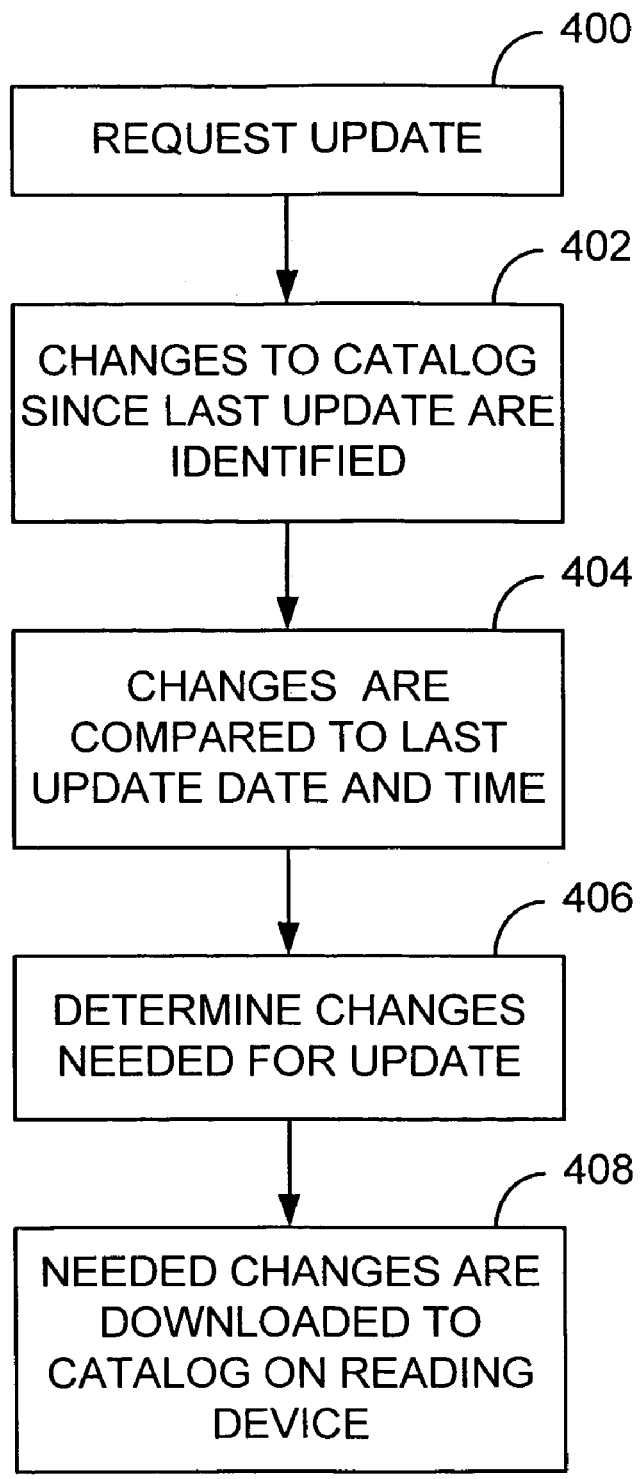
FIG. 11 is a flowchart illustrating updating an offline catalog in accordance with the present invention.

Thus, with reference to FIG. 11, for updating and/or customizing the catalog, when the reading device is on-line, the device may request an update or the network may inform it that an update is needed (400). Changes made to the catalog since the last update are identified by the network (402). These changes are compared to the device's last update date and time to determine which changes are to be provided to the device (404, 406). Likewise, any sections that have been requested to be added by the user are added. The requested sections and the updated content are downloaded to the device from the network (408).

Secure Transactions

Several possible combinations of security and credit card information are possible, at the discretion of the user. Security is based on whether or not the user has decided to store their credit card information on the reading device to facilitate future purchases. If the user elects not to do this, they will be prompted to enter new credit card data for each session into a blank form associated with the order form before they will be authorized to order any items. If a user decides to save credit card information so that they do not have to re-enter it each time, preferably they will enable and set a passcode. Entering the passcode will act as authorization for the purchase. It will be requested once during each session (the first time the order/buy button is pressed). However, it is possible for users to save credit card information and to not set any passcode. In this case, any order requests will be added to the order form and purchased without further authentication from the user (beyond displaying normal status messages).

Figure 7:
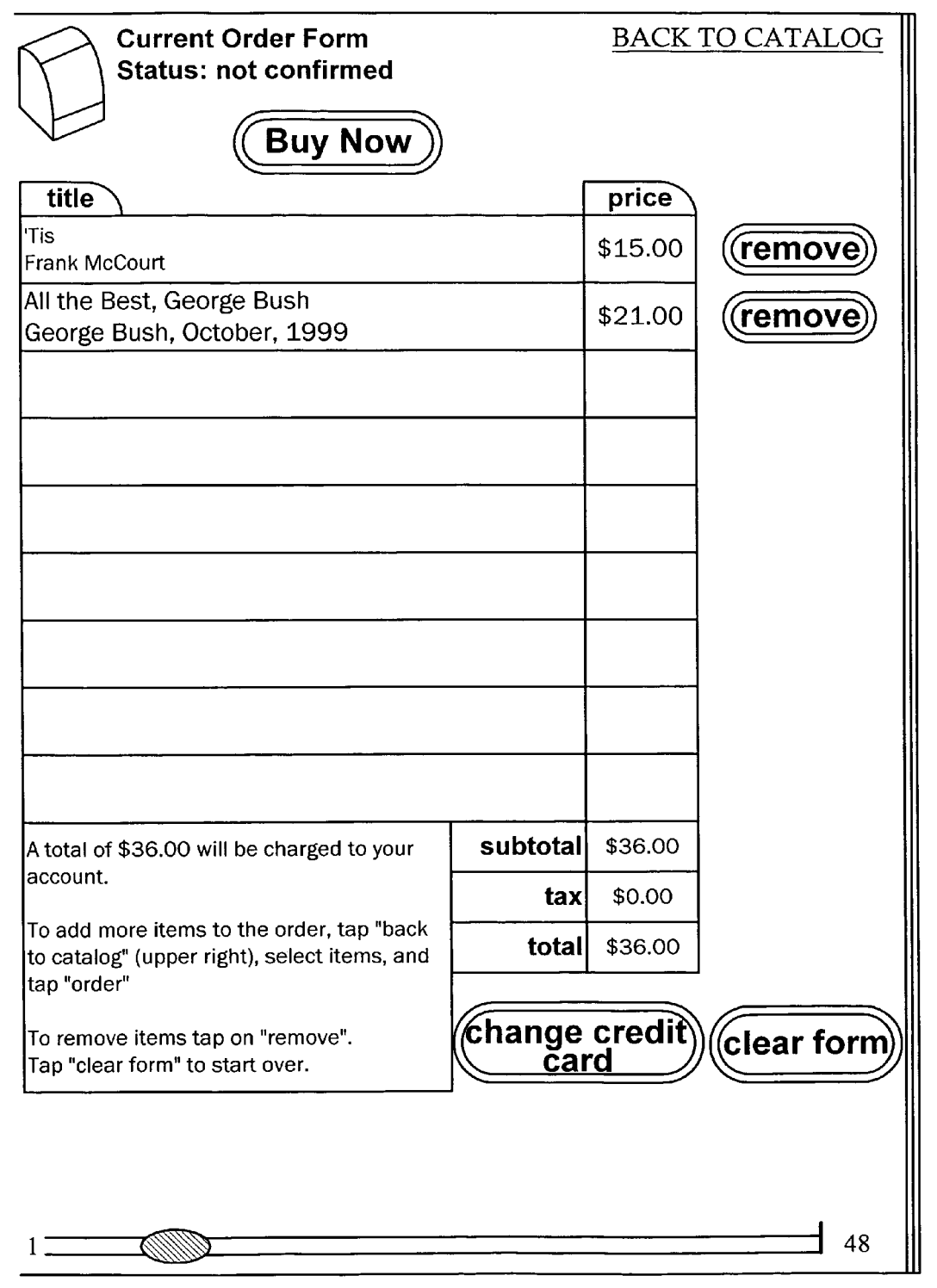

Credit card information handling has a number of aspects impacting security and user experience. For new users, the very first time they try to buy through the off-line catalog, their credit card information will be blank. In this case, when the user first presses the order button (or buy button if online) they will be prompted for this information since they have no credit card information on file. A form will appear (See FIG. 7). Tapping the fields on the order form will allow the user to select particular items and enter data. Alternatively, as with other forms data, the user can start at the first item, enter data, and press the next button to go to the next field automatically. The user chooses whether to save or not save this credit card information for future purchases. The credit card information will be saved with the current order form regardless of this setting since the intent is for that credit card to enable the user to buy the content they have chosen and are actively purchasing from the catalog. If the user does not select the "save credit card" option, then the credit card information is affixed to the current order form and will apply for that purchase only.

Once entered, the user's credit card information may be encrypted and, if enabled, saved on the device. Any problems validating the credit card information preferably will be reported to the user via a message tray the next time the user powers on the device. Credit card data may be re-accessed and modified from the "Secure Credit Card Information" form presented as the last page of the Order Form "book." When displayed, the existing credit card number will show only the last 4 digits for additional security.

Users may change designated credit cards for the order purchase before it occurs by paging to the "Secure Credit Card Information" form presented as the last page of the "Order Form" book.

For an order form to be useful for completing a purchase, credit card information must be attached (even if not saved for future purchases). Users enter the new credit card information that will apply to that as-yet-unprocessed order. If the user does not check the "save" option, the new credit card will only apply to that particular order form. Any items ordered subsequently as part of that same session (prior to the order being processed) will reflect the new credit card information as part of the confirmation message tray and will be added to that same order form. Once the order has been processed, only saved credit card information will apply to future orders. If the user does check the "save" option then this new credit card information will apply both to the current order form and to any future orders. The new information will replace the old credit card information, if any.

Preferably, order forms always exist on the local bookshelf even when no items have been requested, in which case they are blank. Orders are generated automatically whenever the user taps on the "order" button next to a title or periodical item. The order form preferably appears as a separate document and may be separately viewed and modified, if desired, by the user. Subsequent orders are appended to the order form.

Preferably, all pages of the catalog include a hot link item called "order form." Pressing this item at any time closes the catalog (preferably at the current page location, which is saved for later reference) and opens the order form document. If the user wishes to return to the catalog, they do so by either explicitly selecting the catalog title from the bookshelf or by pressing a hot link in the order form labeled "back to catalog". Either of these two options returns the user to the last page viewed in the catalog.

Order forms preferably are treated in "book-like" ways. The user may select the "get info" icon that will result in a tray describing the status of the order, the number of items and the size of the file. The "get info" tray preferably has the normal book related options: open, remove, etc. Tapping on the order form title will open that order form document for review or changes. Items preferably may be removed at this time. A running total is preferably provided. To add more items to the order, the user preferably taps the "back to catalog" link or opens the catalog from the local bookshelf by tapping on the catalog title.

Order forms may be processed the next time the reader connects (either the user requests a connection or the device automatically connects), or are processed immediately when the user taps "buy now." Once payment information is validated on-line, each of the items ordered is delivered automatically to the user's on-line bookshelf where it preferably appears in the New category. Following this, the server may execute its normal automatic download procedures to download all items in the New category from the online bookshelf to the local bookshelf. The newly purchased content is handled as any other new content from this point on.

Users may choose to purchase the items "now" through the order form if they do not wish to wait, i.e., while on-line. The "buy now" button or icon on the order form will initiate a network connection to the bookstore using whatever means possible and, once connected, will send the order form off to the bookstore for immediate processing. If payment authentication is authorized, the newly purchased items will immediately appear in the online bookshelf.

Figure 10:
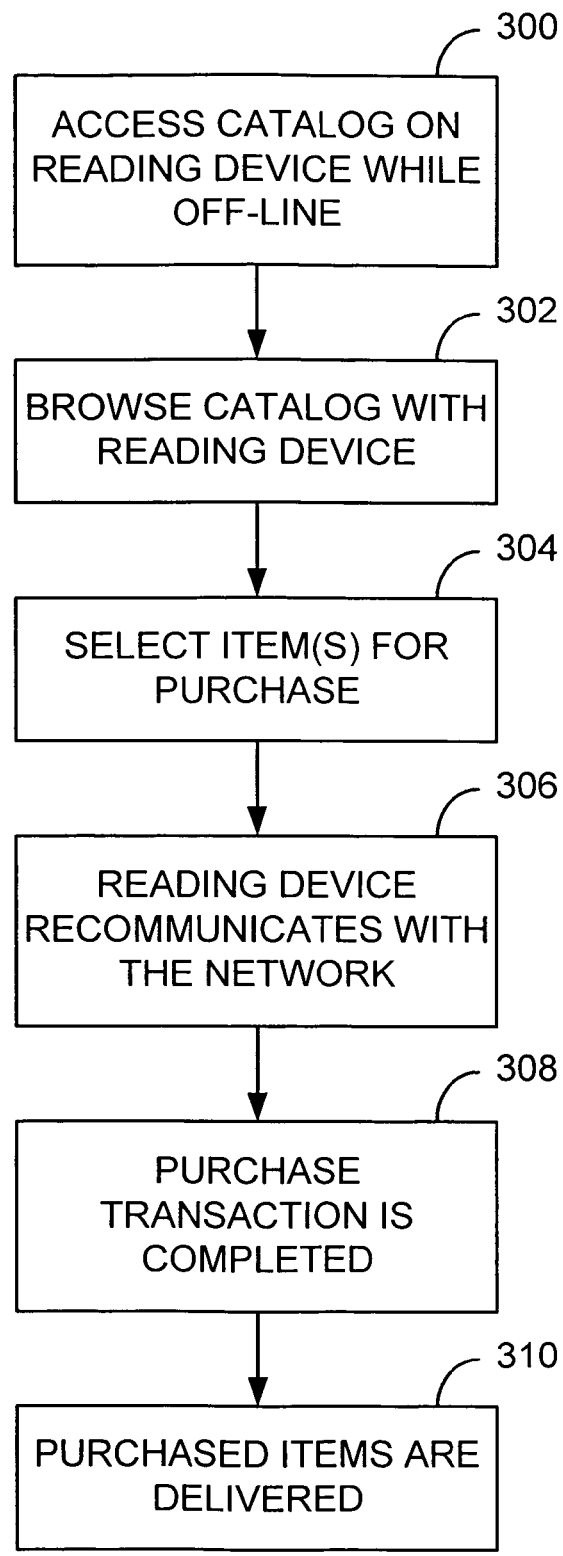
FIG. 10 is a flowchart illustrating purchasing via an offline catalog in accordance with the present invention.

Accordingly, with reference to FIG. 10, a user accesses their catalog on their reading device while the reading device is off-line (300). The user is able to leisurely browse the catalog without worrying about tying-up an internet connection (302). The user selects item(s) they wish to purchase by tapping or pressing the appropriate icon or button (304). Later, upon reconnection of the reading device to the network, either manually or automatically, the purchase transaction is completed (306, 308). The purchased items are preferably delivered with minimal delay to the user (310).

In summary, users browse the catalog with their reading device. This may occur on-line or off-line. Upon deciding to make a purchase, the user makes the appropriate selection and handles payment in accordance with one of the previously described manners. If the device is on-line, then the user indicates "Buy Now" (or the device may automatically handle the purchase). If the device is off-line, then the next time it is on-line—either manually or automatically—the purchase transaction is completed.

Those skilled in the art, will understand that other types of devices may be used for viewing the catalog, such as, for example, computers, televisions (with an appropriate "set-top box"), PDAs (personal digital assistants), etc. Generally, devices that may communicate with a network such as the Internet and that include a display and memory may be used.

Likewise, the catalog could be presented with other forms of electronically deliverable content such as audio, video, etc., in addition to or in place of the text content. The catalog and updates could also be provided non-electronically, for example, with a compact disk, ROM, etc. Also, non-electronically deliverable assets could additionally or alternatively be ordered through the catalog of the present invention, although this would require integration with the necessary fulfillment infrastructure.

The attached Appendix includes examples of protocols for the present invention.

Although the present invention has been described with reference to specific exemplary embodiments, it will be appreciated that it is intended to cover all modifications and equivalents within the scope of the appended claims.

What is clamed is:

1. A method for facilitating electronic transactions via a device capable of communicating with a network, the method comprising:
    providing a server having a catalog of assets and a plurality of assets;
    providing the catalog of assets from the server to the network;
    communicating with the network a first time via the device;
    providing the catalog to the device from the network;
    discontinuing the first time communication with the network via the device;
    when the device is not in communication with the network, selecting at least one desired transaction within the catalog, the at least one desired transaction including selecting an asset from the catalog, which selected asset can be downloaded to the device;
    storing the at least one desired transaction on the device;
    communicating with the network a second time via the device in response to the selection of the transaction;
    completing the at least one desired transaction, the at least one desired transaction comprising:
        retrieving the selected asset from the server with the plurality of assets;
        providing the selected asset from the server to the network; and
        downloading the selected asset to the device from the network;
    discontinuing the second time communication with the network via the device;
    modifying the selected asset on the device;
    storing the modifications of the selected asset to the device;
    communicating with the network a third time via the device; and
    uploading the stored modifications to the network.

2. A method in accordance with claim 1 wherein multiple desired transactions are selected.

3. A method in accordance with claim 1 wherein the catalog includes multiple sections and a user selects which sections to download.

4. A method in accordance with claim 1 further comprising updating the catalog when recommunicating with the network.

5. A method in accordance with claim 4 wherein assets purchased by a user are removed from the catalog during an update.

6. A method in accordance with claim 5 wherein updating the catalog comprises:
   requesting an update of the catalog on the device from the network;
   identifying changes made since a previous catalog update;
   comparing a last update date and time for the catalog on the device to a list of changes made to the catalog on the network to determine items that need to be provided to the device in the update;
   downloading from the network to the device only the items; and
   updating the catalog on the device with the items.

7. A method in accordance with claim 6 wherein the updating occurs automatically.

8. A method in accordance with claim 7 wherein the updating occurs aperiodically.

9. A method in accordance with claim 8 wherein the device communicates with the network a second time automatically.

10. A method in accordance with claim 1 wherein the device communicates with the network a second time automatically.

11. A method in accordance with claim 1 wherein the device is an electronic book reading device.

12. A method in accordance with claim 1 wherein the transaction involves the purchase of textual content.

13. A method in accordance with claim 12 wherein the textual content comprises a book.

14. A method in accordance with claim 1 wherein assets that are included within the catalog are determined by predetermined criteria.

15. A method in accordance with claim 14 wherein the criteria comprise featured assets, newer assets, limited time assets, most popular assets, and assets not yet purchased by a user.

16. An electronic transactions system comprising:
   a server having a catalog of assets and a plurality of assets;
   a network in communication with the server;
   a device capable of communicating with the network to download the catalog from the server to the device;
   wherein a desired transaction is indicated on the catalog when the device is not in communication with the network, the at least one desired transaction is further indicated by selecting an asset from the catalog, which selected asset can be downloaded to the device;
   wherein the desired transaction is completed, in response to the selection of the asset, by retrieving the selected asset from the server with the plurality of assets, providing the selected asset from the server to the network, and downloading the selected asset to the device when the device subsequently communicates with the network;
   wherein the selected asset is modified on the device;
   wherein the modifications of the selected asset are stored to the device; and
   wherein the stored modifications are uploaded to the network.

17. An electronic transactions system in accordance with claim 16 wherein the device is an electronic book.

18. An electronic transactions system in accordance with claim 16 wherein the catalog further comprises a plurality of downloadable selections for the electronic book.

19. An electronic transactions system in accordance with claim 16 wherein the catalog includes multiple sections and a user selects which sections to download.

20. An electronic transactions system comprising:
   means for providing a server having a centralized catalog of assets and a plurality of assets;
   means for providing the centralized catalog of assets and the plurality of assets from the server;
   means for reading textual content and being capable of communicating with the means for providing the centralized catalog of assets a first time;
   means for downloading a catalog from the means for providing the centralized catalog of assets and the plurality of assets from the server to the means for reading textual content;
   means for selecting a desired transaction from the catalog at the means for reading textual content when the means for reading textual content is not communicating with means for providing the centralized catalog and the plurality of assets from the server the first time, the means for selecting a desired transaction including means for selecting an asset from the catalog, which selected asset can be downloaded to the device;
   means for completing the desired transaction, in response to the selection of the transaction, by retrieving the selected asset from the server with the plurality of assets, providing the selected asset from the server to the means for providing the plurality of assets, and downloading the selected asset when the means for reading textual content communicates with the means for providing the centralized catalog and the plurality of assets from the server a second time;
   means for modifying the selected asset at the means for reading textual content when the means for reading textual content is not communicating with the means for providing a centralized catalog the second time;
   means for storing the modifications of the selected asset at the means for reading textual content; and
   means for uploading the stored modifications to the means for providing the centralized catalog and the plurality of assets from the server when the means for reading textual content communicates with the means for providing the centralized catalog and the plurality of assets from the server a third time.

* * * * *

UNITED STATES PATENT AND TRADEMARK OFFICE
CERTIFICATE OF CORRECTION

PATENT NO.        : 7,437,318 B2                                Page 1 of 1
APPLICATION NO.   : 10/112086
DATED             : October 14, 2008
INVENTOR(S)       : Yuen et al.

It is certified that error appears in the above-identified patent and that said Letters Patent is hereby corrected as shown below:

Title Page, References Cited, Item (56), Other Publications, in "Algre", change "Tiime" to -- Time -- and change "telecommunications" to -- Telecommunications --

Title Page, References Cited, Item (56), Other Publications, in the second occurrence of reference with author "Gold", change "browswer" to -- browser --

Title Page, References Cited, Item (56), Other Publications, in "IBM to Unveil", change "Top" to -- To --

Column 1, line 12, insert -- for all -- after "reference"

Column 3, line 3, change "aperiodical" to -- a periodical --

Column 6, line 3, insert -- - -- before "how"

Column 7, line 2, delete "that" at beginning of line

Signed and Sealed this

Third Day of March, 2009

JOHN DOLL
*Acting Director of the United States Patent and Trademark Office*